United States Patent [19]

Kawata

[11] Patent Number: 4,772,805

[45] Date of Patent: Sep. 20, 1988

[54] LAMP ILLUMINATION ADJUSTING APPARATUS

[75] Inventor: Toshihiko Kawata, Furukawa, Japan

[73] Assignee: Alps Electric Co., Ltd., Japan

[21] Appl. No.: 25,674

[22] Filed: Mar. 13, 1987

[30] Foreign Application Priority Data

Jul. 28, 1986 [JP] Japan ................................. 81-176994

[51] Int. Cl.$^4$ ........................ H03K 3/00; H05B 39/04
[52] U.S. Cl. ................ 307/10 LS; 307/10 R; 307/106; 315/241 P; 315/151; 318/341; 318/139; 340/52 R; 340/81 R
[58] Field of Search ............... 307/10 R, 9, 10 LS, 307/10 BP, 228; 340/74, 76, 81 R, 92, 2 R; 315/76, 77, 246, 287, 82, 291, 83, 158, 151, 241 P; 318/139, 341

[56] References Cited

U.S. PATENT DOCUMENTS

| | | | |
|---|---|---|---|
| 3,780,340 | 12/1973 | Munro | 315/151 |
| 4,004,188 | 1/1977 | Cooper | 315/158 X |
| 4,020,361 | 4/1977 | Suelzle et al. | 307/106 |
| 4,117,453 | 9/1978 | Hodgson et al. | 315/83 X |
| 4,156,166 | 5/1979 | Shapiro et al. | 315/241 P X |
| 4,275,335 | 6/1981 | Ishida | 315/158 X |
| 4,309,639 | 1/1982 | Thrower et al. | 315/82 |
| 4,373,146 | 2/1983 | Bonazoli et al. | 315/246 X |
| 4,443,741 | 4/1984 | Tanaka et al. | 315/158 X |
| 4,458,183 | 7/1984 | Neilson | 318/341 X |
| 4,599,548 | 7/1986 | Schultz | 318/341 X |
| 4,623,824 | 11/1986 | Scolari et al. | 315/241 P X |
| 4,634,933 | 1/1987 | Kamon et al. | 315/151 |

Primary Examiner—William M. Shoop, Jr.
Assistant Examiner—Paul Ip
Attorney, Agent, or Firm—Guy W. Shoup; Leighton K. Chong; Paul J. Winters

[57] ABSTRACT

A lamp illumination adjusting apparatus for automobiles comprises a reference triangular wave generator, an adjusting voltage setting circuit, a comparator to compare the reference triangular signal with the adjusting voltage and to output comparison signal, a driver circuit including a MOS field effect transistor which is controlled directly by the comparison signal, and a lamp which is connected in series to the driver circuit and interposed between a power source terminal and the ground.

1 Claim, 2 Drawing Sheets

LAMP ILLUMINATION ADJUSTING APPARATUS

BACKGROUND OF THE INVENTION

1. Field of the Invention

The present invention relates to a lamp illumination adjusting apparatus for automobiles, which is improved to decrease the heat generation and to enable the compact structure.

2. Description of the Prior Art

In an example of a lamp illumination adjusting means in the prior art, series connection of a lamp and a power transistor is interposed between a power source terminal and the ground, and impedance of the power transistor is adjusted, thereby amount of driving current flowing through the lamp is adjusted so as to adjust the illumination. In this illumination adjusting means, however, since large power loss is produced in the power transistor and the heat generation is much, a large heat radiation fin is required and the apparatus cannot be made compact. Moreover, value of the driving current and the intensity of illumination of the lamp are in non-linear relation and therefore means to correct this relation is required.

Consequently, a lamp illumination adjusting apparatus has been proposed where a power transistor is turned on or off by PWM (Pulse Width Modulation) control and the power loss is made little.

FIG. 4 is a circuit diagram of an example of a lamp illumination adjusting apparatus by PWM control in the prior art.

In FIG. 4, series connection of a lamp 2 and a power transistor 3 is interposed between a power source terminal 1 and the ground. Base of the power transistor 3 is supplied with bias voltage by resistors 4, 5, and grounded through a transistor 6. Base of the transistor 6 is supplied with pulse signals outputted from a timer 7. The timer 7 adjusts period of the pulse signals by adjusting a slidable terminal of a variable resistor 8 by manual operation.

In such constitution, if pulse signal is outputted from the timer 7 and the transistor 6 is turned on, the power transistor 3 is turned off and the driving current of the lamp 2 is interrupted. While pulse signal is not outputted from the timer 7, the transistor 6 is turned off and the power transistor 3 is turned on by bias voltage set by the resistors 4, 5 thereby the driving current flows through the lamp 2. In this state, period of the pulse signal outputted from the timer 7 is adjusted, thereby duty of the power transistor 3 is adjusted so as to adjust the average intensity of illumination of the lamp 2.

In this constitution, the lamp 2 is PWM controlled, thereby the power loss due to the power transistor 3 is decreased and the heat generation is decreased, thus the power transistor of small capacity may be used and a heat radiation fin may be of small size and the apparatus can be made compact. Moreover, since the average intensity of illumination of the lamp 2 is adjusted by adjusting proportion of lighting and putting-out of the lamp, period of the pulse signals and the average intensity of illumination are in linear relation.

In the above-mentioned lamp illumination adjusting apparatus of the prior art, however, current flows always through the resistor 4 which sets bias voltage to the power transistor 3 thereby the power loss is produced. Consequently, an element with high wattage must be used as the resistor 4 and therefore the element becomes large size. Moreover, in order to radiate the heat of the resistor 4, the lamp illumination adjusting apparatus cannot be incorporated within a closed cabinet. Particularly, in use within an atmosphere including a large amount of dust or mist of automobiles, it becomes a serious problem that the apparatus as a whole cannot be incorporated within a closed cabinet.

Moreover, since the PWM control is performed in response to pulse signal outputted from the timer 7, the lamp 2 is put out while the pulse signal is outputted, thereby the duty cannot be adjusted in wide range of 0~100%.

SUMMARY OF THE INVENTION

In order to eliminate above-mentioned disadvantages of the lamp illumination adjusting apparatus of the prior art, an object of the invention is to provide a lamp illumination adjusting apparatus wherein the heat generation is little and the compact constitution is easy.

In order to attain the above object, a lamp illumination adjusting apparatus of the invention comprises a reference triangular wave generator for outputting reference triangular signals, an adjusting voltage setting circuit for setting any adjusting voltage, a comparator for comparing the reference triangular signal with the adjusting voltage and outputting comparison signal, a driver circuit including MOS field effect transistor which is ON/OFF controlled directly by the comparison signal, and a lamp which is connected in series to the driver circuit and interposed between a power source terminal and the ground.

Since the reference triangular signal and the adjusting voltage are compared in the comparison circuit and the MOS field effect transistor included in the driver circuit is ON/OFF controlled directly by comparison signal outputted from the comparison circuit, setting of the adjusting voltage enables adjustment in duty of wide range of 0~100%. Moreover, the heat generation is quite little on account of ON/OFF control of the MOS field effect transistor, and the compact constitution is possible and the apparatus as a whole can be incorporated within a closed cabinet.

DESCRIPTION OF PREFERRED EMBODIMENT

Figure 1:
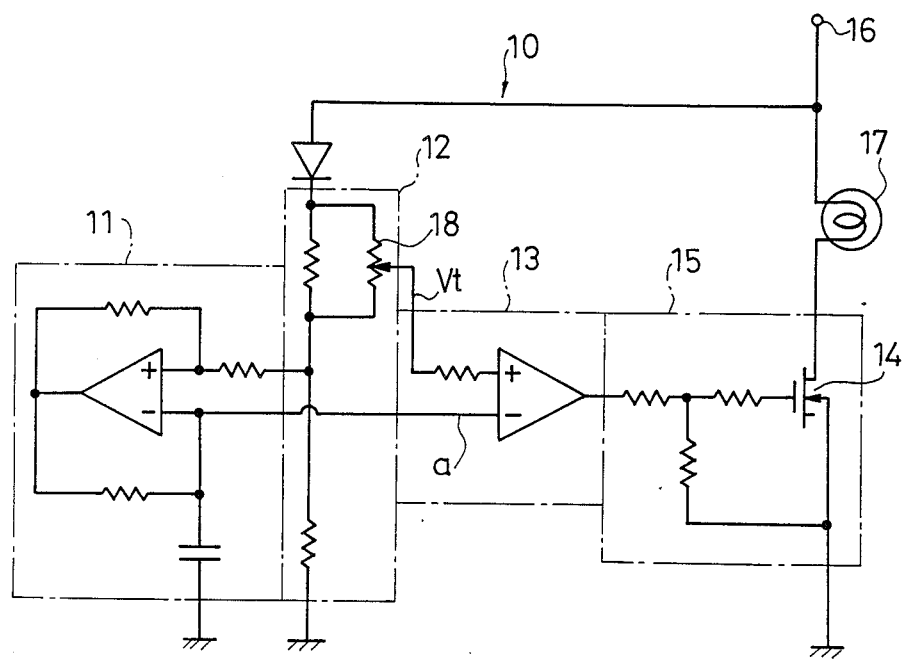
FIG. 1 is a circuit diagram of a lamp illumination adjusting apparatus as an embodiment of the invention.
Figure 2A:
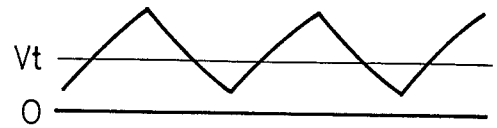
FIG. 2 is a waveform chart illustrating operation of FIG. 1.
Figure 2B:
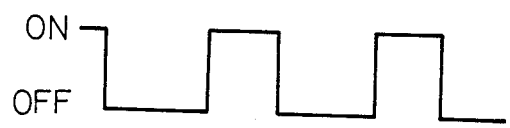
Figure 3:
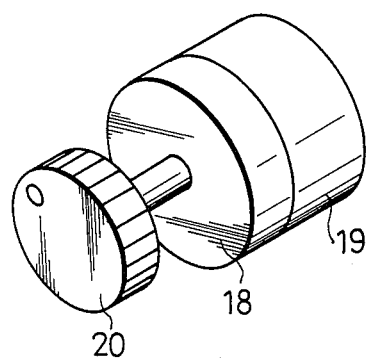
FIG. 3 is a perspective view of the apparatus.
Figure 4:
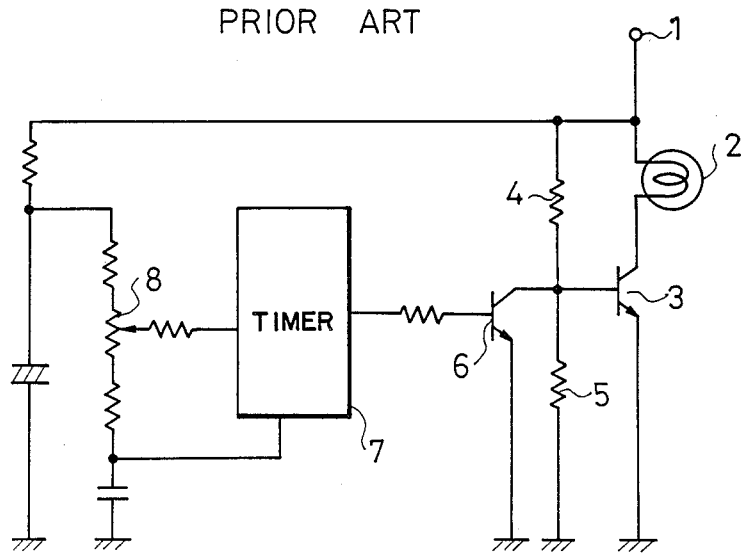
FIG. 4 is a circuit diagram of an example of a lamp illumination adjusting apparatus by PWM control in the prior art.

An embodiment of the invention will now be described referring to the accompanying drawings. FIG. 1 is a circuit diagram of a lamp illumination adjusting apparatus as an embodiment of the invention; FIG. 2 is a waveform chart illustrating operation of FIG. 1; and FIG. 3 is a perspective view of the appearance of an example where the whole apparatus is assembled integrally.

In FIG. 1, a lamp illumination adjusting apparatus 10 comprises a reference triangular wave generator 11, an adjusting voltage setting circuit 12, a comparator 13, a driver circuit 15 including a MOS field effect transistor 14, and a lamp 17 which is connected in series to the MOS field effect transistor 14 and interposed between a power source terminal 16 and the ground.

The reference triangular wave generator 11 is composed of a resistor, a capacitor and an operation amplifier. The reference triangular wave generator 11 outputs reference triangular signals of definite period as shown in FIG. 2(a), and the output signals are supplied to minus input end of an operation amplifier to constitute the comparator 13. The adjusting voltage setting circuit 12 sets adjusting voltage $V_t$ by adjusting a slidable terminal of a variable resistor 18 interposed between the power source terminal 16 and the ground by manual operation arbitrarily, and the adjusting voltage $V_t$ is supplied to plus input end of the operation amplifier to constitute the comparator 13. The low end of the variable resistor is connected through another resistor to ground, and is also connected to one input terminal of the operation amplifier of the triangular wave generating circuit to supply a stabilized operation voltage thereto. The comparator 13 outputs comparison signal of plus voltage when the adjusting voltage $V_t$ is higher than the reference triangular signal, and the comparison signal is supplied to gate of the MOS field effect transistor 14 of the driver circuit 15. The MOS field effect transistor 14 is ON/OFF controlled as shown in FIG. 2(b). If the adjusting voltage $V_t$ is set high, proportion of the ON period of the MOS field effect transistor 14 is increased and the average intensity of illumination of the lamp 17 becomes high. On the other hand, if the adjusting voltage $V_t$ is set low, proportion of the ON period is decreased and the average intensity of illumination becomes low. Consequently, duty of the lamp 17 can be adjusted in wide range of $0 \sim 100\%$.

The MOS field effect transistor 14 is ON/OFF controlled directly by the comparison signal of the comparator 13, and bias voltage to be applied to the gate is not required. Consequently, the heat generation of the driver circuit 15 including the MOS field effect transistor 14 is quite little and a heat radiation fin or the like is not required, thereby the apparatus can be easily made compact and can be incorporated in a closed cabinet.

Consequently, as shown in FIG. 3, a cabinet 19 to incorporate other circuit elements of the lamp illumination adjusting apparatus 10 can be arranged at rear side of a cabinet of the variable resistor 18 included in the adjusting voltage setting circuit 12 so that the apparatus as a whole is constituted integrally. In FIG. 3, numeral 20 designates an operation knob to adjust position of the slidable terminal of the variable resistor 18 by manual operation.

Concrete circuit constitution of the reference triangular wave generator 11, the adjusting voltage setting circuit 12, the comparator 13 and the driver circuit 15, of course, is not limited to the above embodiment. Furthermore, setting of the adjusting voltage $V_t$ is not limited to manual operation, but it may be set by a microcomputer or the like.

According to the lamp illumination adjusting apparatus of the invention as above described, the heat generation of the driver circuit to perform ON/OFF control of the driving current of the lamp is quite little, thereby the apparatus can be easily made compact and can adjust the duty at wide range.

What is claimed is:

1. A lamp illumination adjusting apparatus comprising:

a reference triangular wave generating circuit including a first operation amplifier for outputting a reference triangular wave signal having a predetermined triangular voltage level and frequency cycle;

an adjusting voltage setting circuit, including a variable resistor having one terminal connected to a power source and its other end connected through another resistor to ground, for outputting a selected constant, adjusting voltage signal indicating a power level to be applied for lamp illumination, wherein said other end of said variable resistor is also connected to supply an operation voltage as an input to one terminal of said first operation amplifier of said reference triangular wave generating circuit;

a comparator circuit, including a second operation amplifier receiving at one input terminal said constant, adjusting voltage signal and at its other input terminal said triangular wave signal, for comparing the reference triangular wave signal of the reference triangular wave generating circuit to the adjusting voltage signal set by the adjusting voltage setting circuit, and outputting a comparison signal composed of ON components for a time period of each cycle when the voltage of the triangular wave signal is exceeded by the voltage of the adjusting voltage signal; and a driver circuit including a MOS field effect transistor having a gate to which only the output comparison signal from the comparator circuit is applied, said driver circuit being connected in series with a lamp via power source so that the MOS field effect transistor is directly ON/OFF controlled by the comparison signal to apply power to the lamp corresponding to the time period of the ON components thereof.

* * * * *